(12) United States Patent
Chang et al.

(10) Patent No.: US 7,151,683 B2
(45) Date of Patent: Dec. 19, 2006

(54) HIGH SPEED MEMORY MODULES UTILIZING ON-TRACE CAPACITORS

(75) Inventors: Ge Chang, Folsom, CA (US); Hany M. Fahmy, Sacramento, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/882,459

(22) Filed: Jun. 30, 2004

(65) Prior Publication Data

US 2006/0002165 A1    Jan. 5, 2006

(51) Int. Cl.
*G11C 5/06* (2006.01)
(52) U.S. Cl. .............. 365/63; 365/185.11; 365/185.05; 711/5
(58) Field of Classification Search .......... 365/63, 365/185.11, 185.05; 711/5
See application file for complete search history.

(56) References Cited

U.S. PATENT DOCUMENTS

| | | | |
|---|---|---|---|
| 5,638,402 A * | 6/1997 | Osaka et al. ............... | 375/257 |
| 6,745,268 B1 | 6/2004 | Greeff et al. | |
| 2003/0043683 A1 * | 3/2003 | Funaba et al. ......... | 365/230.03 |
| 2003/0223290 A1 | 12/2003 | Park et al. | |
| 2004/0071040 A1 * | 4/2004 | Funaba et al. ............ | 365/232 |
| 2004/0125635 A1 * | 7/2004 | Kuzmenka ................ | 365/51 |
| 2004/0215990 A1 * | 10/2004 | Allen et al. ................ | 713/320 |
| 2005/0050285 A1 * | 3/2005 | Haas et al. ................ | 711/162 |

OTHER PUBLICATIONS

Patent Abstracts of Japan, vol. 1996, Apr. 30, 2004; JP 07 321828 A (Fujitsu Ltd), Dec. 8, 1995.
PCT Search Report and Written Opinion dated Dec. 29, 2005.

* cited by examiner

*Primary Examiner*—Richard Elms
*Assistant Examiner*—N Nguyen
(74) *Attorney, Agent, or Firm*—Philip A. Pedigo

(57) ABSTRACT

Apparatus and method for producing memory modules having a plurality of dynamic random access memory (DRAM) devices or synchronous random access memory (SDRAM) devices connected to a memory bus, each DRAM or SDRAM device connected to the memory bus via a transmission signal (TS) line. The memory bus includes at least one TS line having a capacitor connected to the TS line in parallel to the plurality of DRAM or SDRAM devices, the TS line connected to the memory bus between a signal insertion end and an attachment point of a TS line of a first DRAM or SDRAM device. A computing system implementing the memory modules is also discussed.

16 Claims, 5 Drawing Sheets

HIGH SPEED MEMORY MODULES UTILIZING ON-TRACE CAPACITORS

BACKGROUND

1. Field

Memory modules

2. Background

Computing systems are comprised of a set of components that communicate with each other over buses and similar communication lines. Computing system components include processors, communication chipsets, memory modules, peripheral components and similar devices. These devices communicate with one another over a set of buses. These buses may utilize communication protocols understood by each of the components on the bus. Some components act as bus controllers to manage communication traffic on the bus.

Computing system speed and efficiency is limited by the speed of buses and communication lines in the computer system. A processor relies on a system bus, memory bus and memory controller to retrieve data and instructions from system memory. The processor is limited in the speed at which it can process these instructions by the speed at which it can receive the data and instructions over the system bus and memory bus from system memory.

Buses are typically communication lines laid out on a printed circuit board (PCB) such as the main board of a computing system. Components (e.g., memory) in the computing system have pins that connect to the lines of the bus. The components communicate across the bus by driving a signal across lines of the bus. These signals are latched by a recipient device. If a signal is not properly terminated, a reflection of the signal may occur or other noise may affect subsequent signaling on the line.

DETAILED DESCRIPTION

Figure 1:
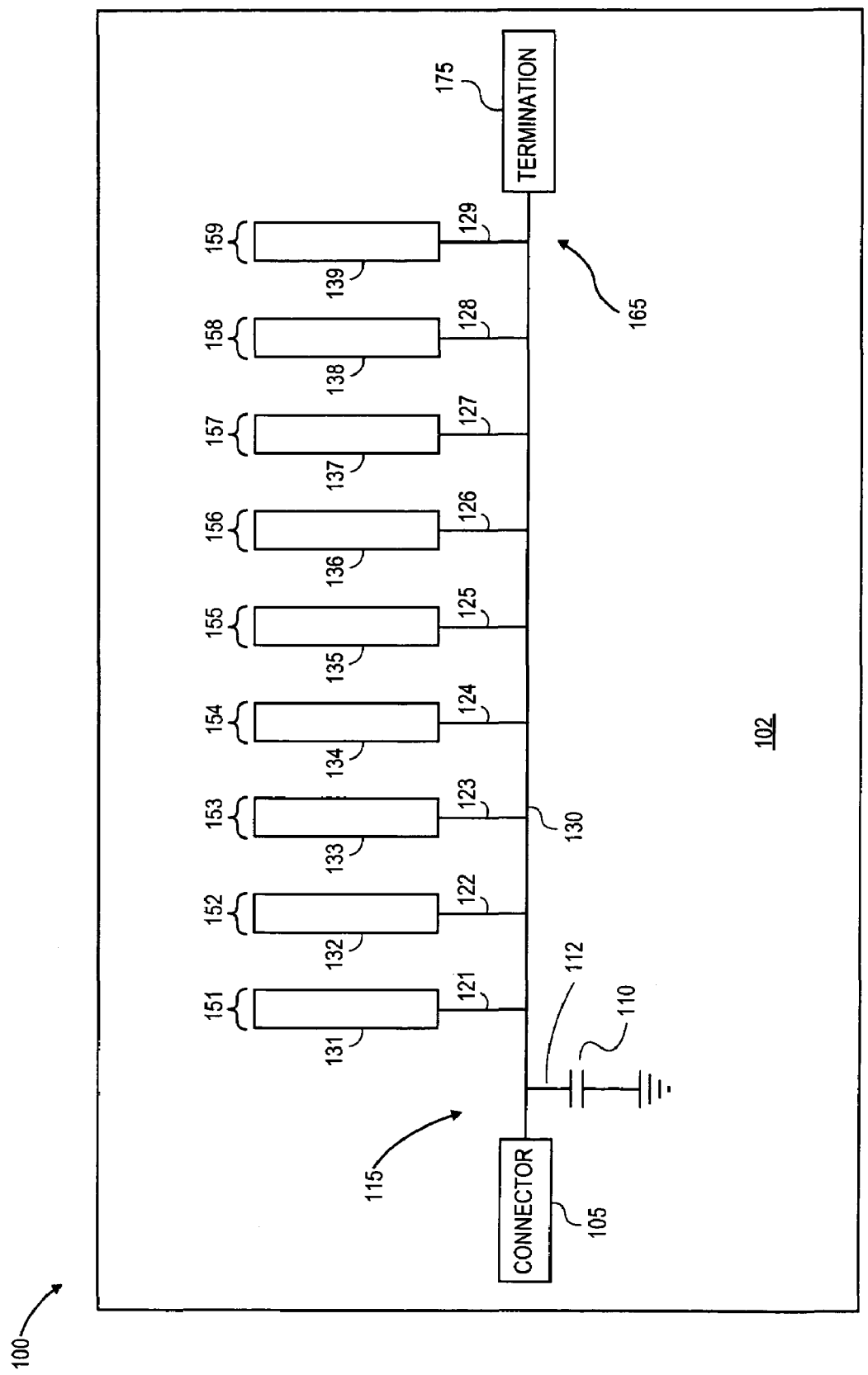
FIG. 1 is a block diagram of one embodiment of a memory module containing at least one capacitor connected in parallel with a dynamic random access memory (DRAM) device and coupled between a signal insertion end of a memory bus and a first attachment point for a transmission signal line of the plurality of DRAM devices.

FIG. 1 is a block diagram of one embodiment of a memory module containing at least one capacitor connected in parallel with a dynamic random access memory (DRAM) device and coupled between a signal insertion end of a memory bus and a first attachment point for a transmission signal line of the plurality of DRAM devices. Memory module 100, in the embodiment shown in FIG. 1, is a single in-line memory module (SIMM).

In one embodiment, memory module 100 is formed on printed circuit board (PCB) 102. PCB 102 may be formed utilizing any method to form printed circuit boards or other types of circuit boards known in the art. In one embodiment, memory module 100 includes transmission signal (TS) lines 121 through 129 formed on PCB 102.

In the embodiment shown in FIG. 1, the pattern on PCB 102 includes memory bus 130 connected to TS lines 121 through 129. In other embodiments, memory module 100 may include any pattern for TS lines 121 through 129 and memory bus 130.

In an embodiment, memory bus 130 includes signal insertion end 115. Signal insertion end 115, in an embodiment, is a section of memory bus 130 beginning at connector 105 and ending at the attachment point of TS line 121 on memory bus 130. Connector 105, in an embodiment, connects memory module 100 (and thus, memory bus 130) to other devices (e.g., a communication hub, processor, etc.) of a computing system.

Memory bus 130 and TS lines 121 through 129, in one embodiment, are formed of copper. In other embodiments, memory bus 130 and TS lines 121 through 129 may be formed of other conductive materials known in the art.

Memory module 100, in one embodiment, includes DRAM devices 131 through 139 connected to TS lines 121 through 139. As discussed above, each TS line is also connected to memory bus 130. In one embodiment, a single DRAM (e.g., DRAM 131) and a single TS line (e.g., TS line 121) form a branch (e.g., branch 151). In the embodiment shown in FIG. 1, DRAM devices 131 through 139 are coupled to TS lines 121 through 129 to form branches 151 through 159, respectively.

DRAM devices 131 through 139 may be any DRAM device known in the art capable of having data written to and read from it by a computing system. In the embodiment shown in FIG. 1, memory module 100 contains nine DRAM devices and branches, however, memory module 100 may contain any number of DRAM devices and branches.

In one embodiment, memory module 100 includes capacitor 110 connected to TS line 112. TS line 112 is connected to signal insertion end 115 of memory bus 130. Capacitor 110, in an embodiment, is connected to TS line 112 in parallel with DRAM device 131.

Capacitor 110, in one embodiment, is a 10 picofarad (pF) capacitor. In other embodiments, capacitor 110 is a capacitor in the range of about one pF to about 40 pF.

Memory module 100, in one embodiment, has at least one additional capacitor connected to a TS line on signal insertion end 115 in parallel with DRAM devices 121 through 129 and capacitor 110. Additional capacitors may be in the range of about one pF to about 40 pF. With at least capacitor 110 connected to signal insertion end 115, in one embodiment, memory bus 130 has a total capacitance in the range of about one pF to about 40 pF.

In one embodiment, memory bus 130 includes termination end 165 located after the attachment point of TS line 129 on memory bus 130 and opposite signal insertion end 115. Termination end 165, in one embodiment, includes termination circuit 175. In an embodiment, termination circuit 175 is connected to source to form a pull-up termination circuit. In another embodiment, termination circuit 175 is connected to ground to form a pull-down termination circuit.

Figure 2:
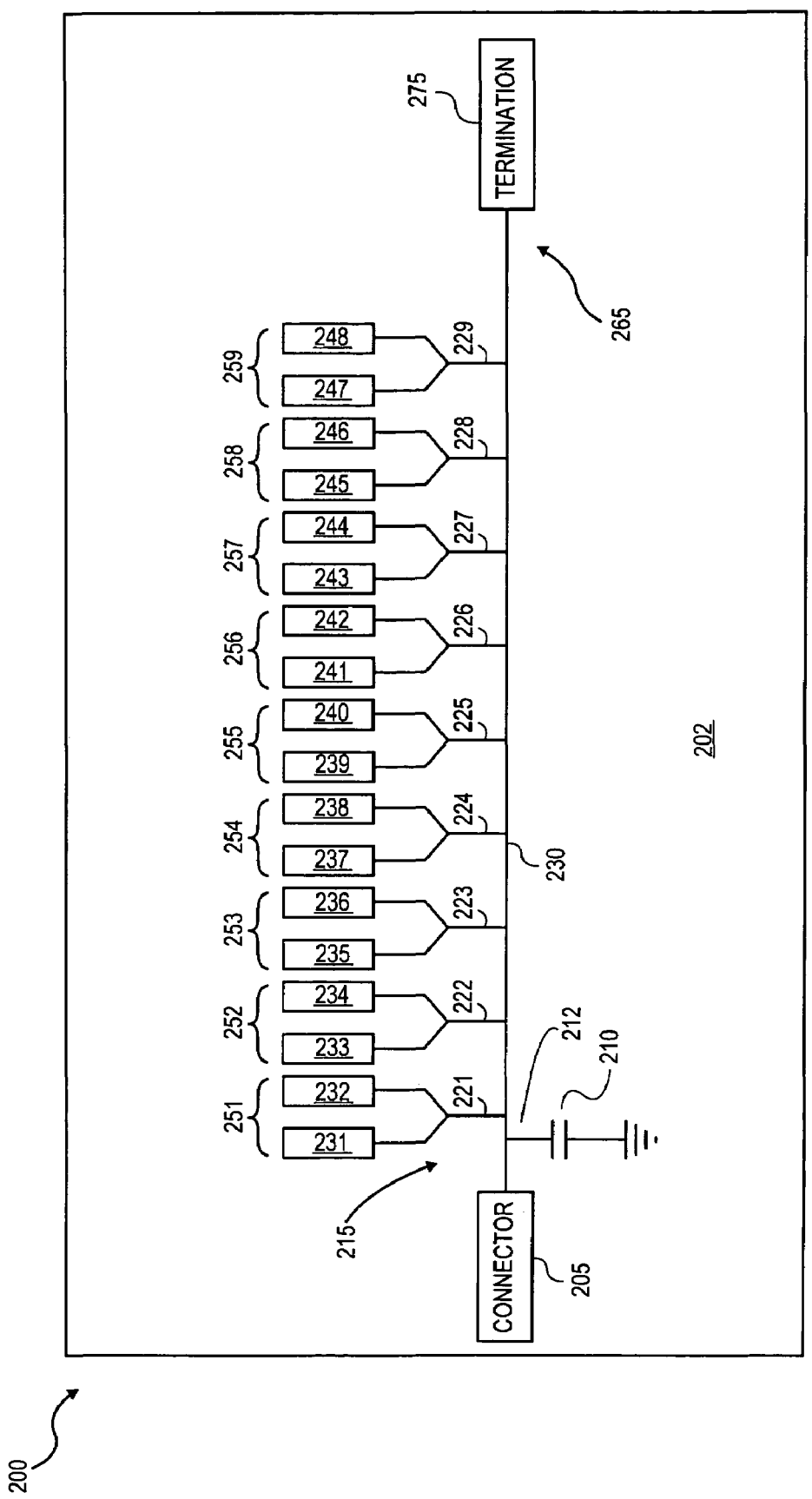
FIG. 2 is a block diagram of an embodiment of a memory module containing at least one capacitor connected in parallel with a synchronous dynamic random access memory (SDRAM) device and coupled between a signal insertion end of a memory bus and a first attachment point for a transmission signal line of the plurality of SDRAM devices.

FIG. 2 is a block diagram of an embodiment of a memory module containing at least one capacitor connected in parallel with a synchronous dynamic random access memory (SDRAM) device and coupled between a signal insertion end of a memory bus and a first attachment point for a transmission signal line of the plurality of SDRAM devices. Memory module 200, in the embodiment shown in FIG. 2, is a double in-line memory module (DIMM).

In one embodiment, memory module 200 is formed on PCB 202 similar to the embodiments discussed above with regard to FIG. 1. Likewise, in one embodiment, memory module 200 includes TS lines 221 through 229 and memory bus 230 on PCB 202 similar to the embodiments discussed above.

Memory module 200, in one embodiment, includes synchronous dynamic random access memory (SDRAM) devices 231 through 248. SDRAM devices 231 through 248 may be any SDRAM devices know in the art capable of having data written to and read from it by a computing system. In other embodiments, SDRAM devices 231 through 248 may be replaced by DRAM devices or other memory devices known in the art capable of having data written to and read from it by a computing system.

SDRAM devices 231 through 248, in one embodiment, are divided into pairs (e.g., SDRAM devices 231, 232; SDRAM devices 233, 234; etc.), and each pair is connected to one of TS lines 221 through 229, respectively, to form branches 251 through 259 consisting of two SDRAM devices and a single TS line.

In the embodiment shown in FIG. 2, memory module 200 contains 18 SDRAM devices forming nine branches, however, memory module 200 may contain any number of SDRAM devices and branches. In addition, in other embodiments, a branch may contain more than two SDRAM devices.

In one embodiment, memory module 200 includes capacitor 210 connected to signal insertion end 215 of memory bus 230 via TS line 212 and in parallel with SDRAM device 231 similar to the embodiments discussed above. Capacitor 210, in one embodiment, is a 10 picofarad (pF) capacitor. In other embodiments, capacitor 210 is a capacitor in the range of about one pF to about 40 pF.

Memory module 200, in one embodiment, has at least one additional capacitor in the range of about one pF to about 40 pF connected to a TS line on signal insertion end 215 and in parallel with SDRAM devices 231 and capacitor 210 similar to embodiments discussed in FIG. 1. Likewise, with at least one capacitor 210 connected to signal insertion end 215, in one embodiment, memory bus 230 has a total capacitance in the range of about one pF to about 40 pF.

In one embodiment, memory bus 230 includes termination end 265 located after the attachment point of TS line 229 on memory bus 230 and opposite signal insertion end 215. Termination end 265, in one embodiment, includes termination circuit 275. In an embodiment, termination circuit 275 is connected to source to form a pull-up termination circuit. In another embodiment, termination circuit 275 is connected to ground to form a pull-down termination circuit.

Figure 3:
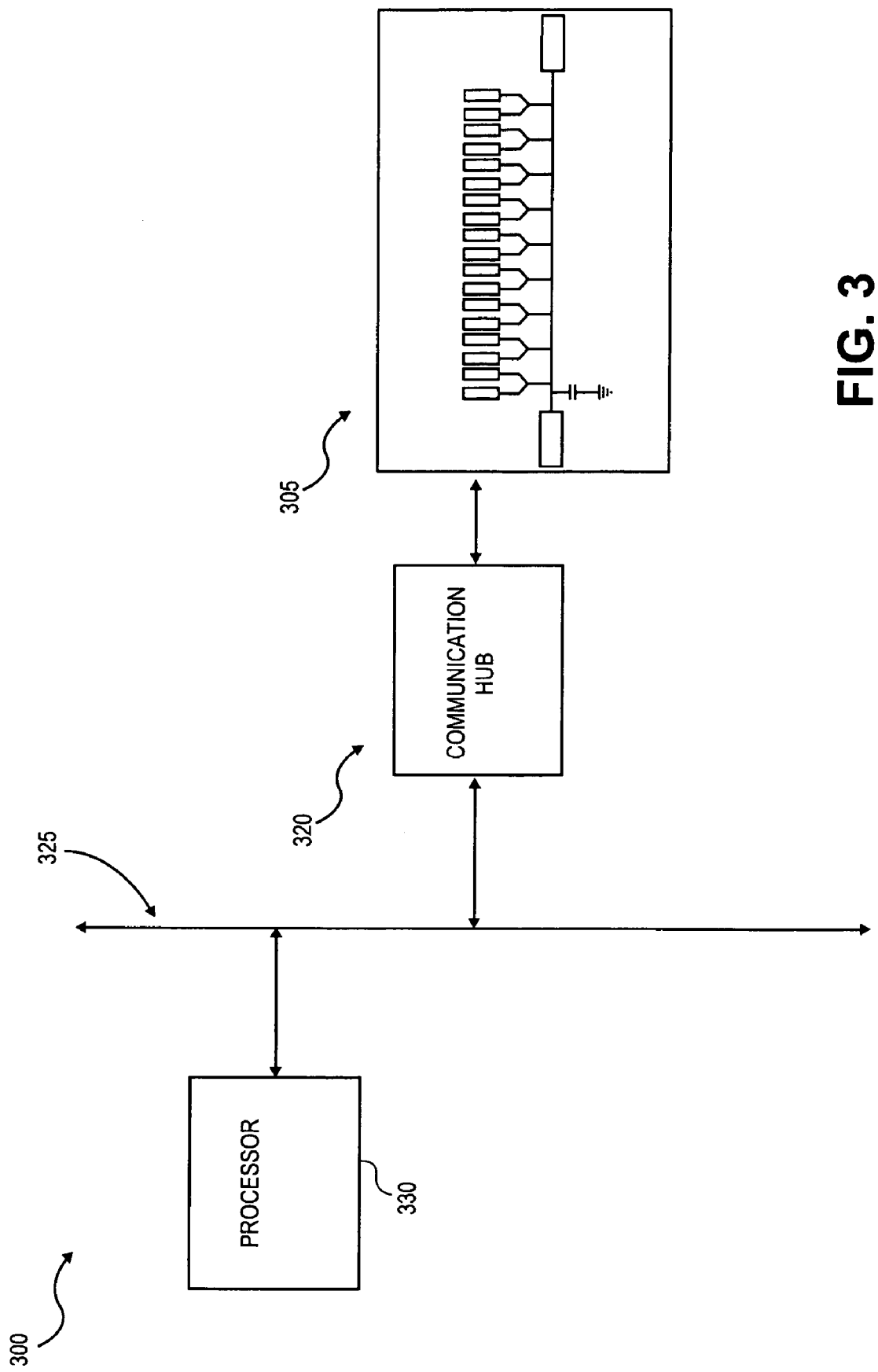
FIG. 3 is a block diagram of an embodiment of a computing system containing the memory module of FIG. 2.

FIG. 3 is a block diagram of an embodiment of a computing system containing the memory module of FIG. 2. Computing system 300, in the embodiment shown in FIG. 3, contains memory module 305 similar to memory module 200 discussed above connected to communication hub 320. In other embodiments, memory module 305 is similar to memory module 100 discussed above.

Communication hub 320 may be any communication hub known in the art capable of facilitating computing transactions. In one embodiment, communication hub 320 is connected to system bus 325. System bus 325 may be any system bus known in the art capable of transmitting computing transactions.

In one embodiment, system bus 325 is connected to processor 330. Processor 330, in one embodiment, is a Pentium 4 processor manufactured by Intel Corporation of Santa Clara, Calif. In other embodiments, processor 330 may be any processor known in the art.

Figure 4:
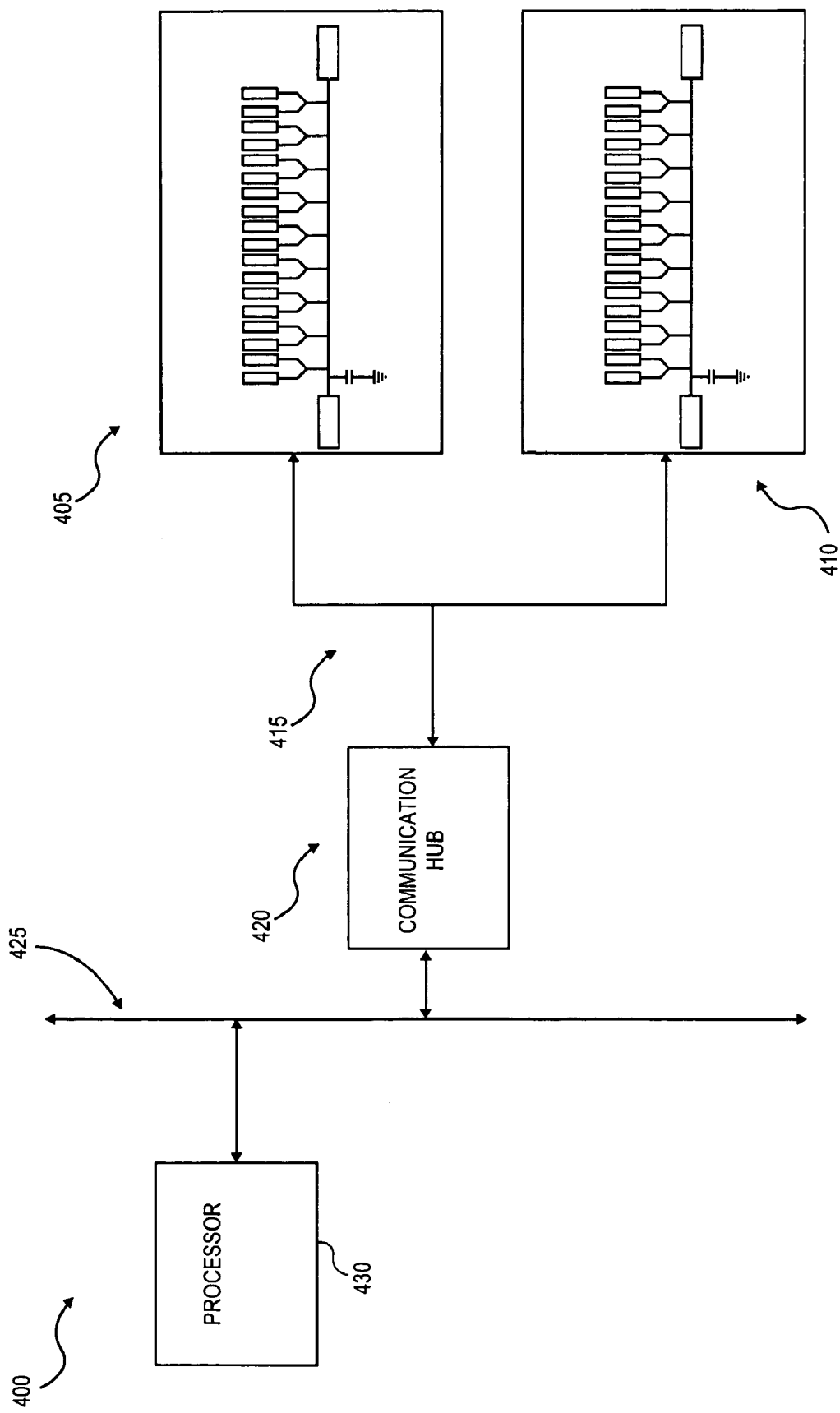
FIG. 4 is a block diagram of one embodiment of a computing system containing a plurality of memory modules of FIG. 2.

FIG. 4 is a block diagram of one embodiment of a computing system containing a plurality of memory modules of FIG. 2. Computing system 400, in the embodiment shown in FIG. 4, contains memory module 405 and memory module 410. Memory modules 405, 410, in the embodiment shown in FIG. 4, are both similar to memory module 200 discussed above. In other embodiments, memory modules 405, 410 are both similar to memory module 100 discussed above.

In one embodiment, memory modules 405, 410 are connected to each other to form a daisy chain configuration. In the embodiment shown in FIG. 4, memory modules 405, 410 are connected to each other and communication hub 420 in connection 415.

Communication hub 420 may be any communication hub known in the art capable of facilitating computing transactions. In one embodiment, communication hub 420 is connected to system bus 425. System bus 425 may be any system bus known in the art capable of transmitting computing transactions.

In one embodiment, system bus 425 is connected to processor 430. Processor 430, in one embodiment, is a Pentium 4 processor manufactured by Intel Corporation of Santa Clara, Calif. In other embodiments, processor 430 may be any processor known in the art.

Figure 5:
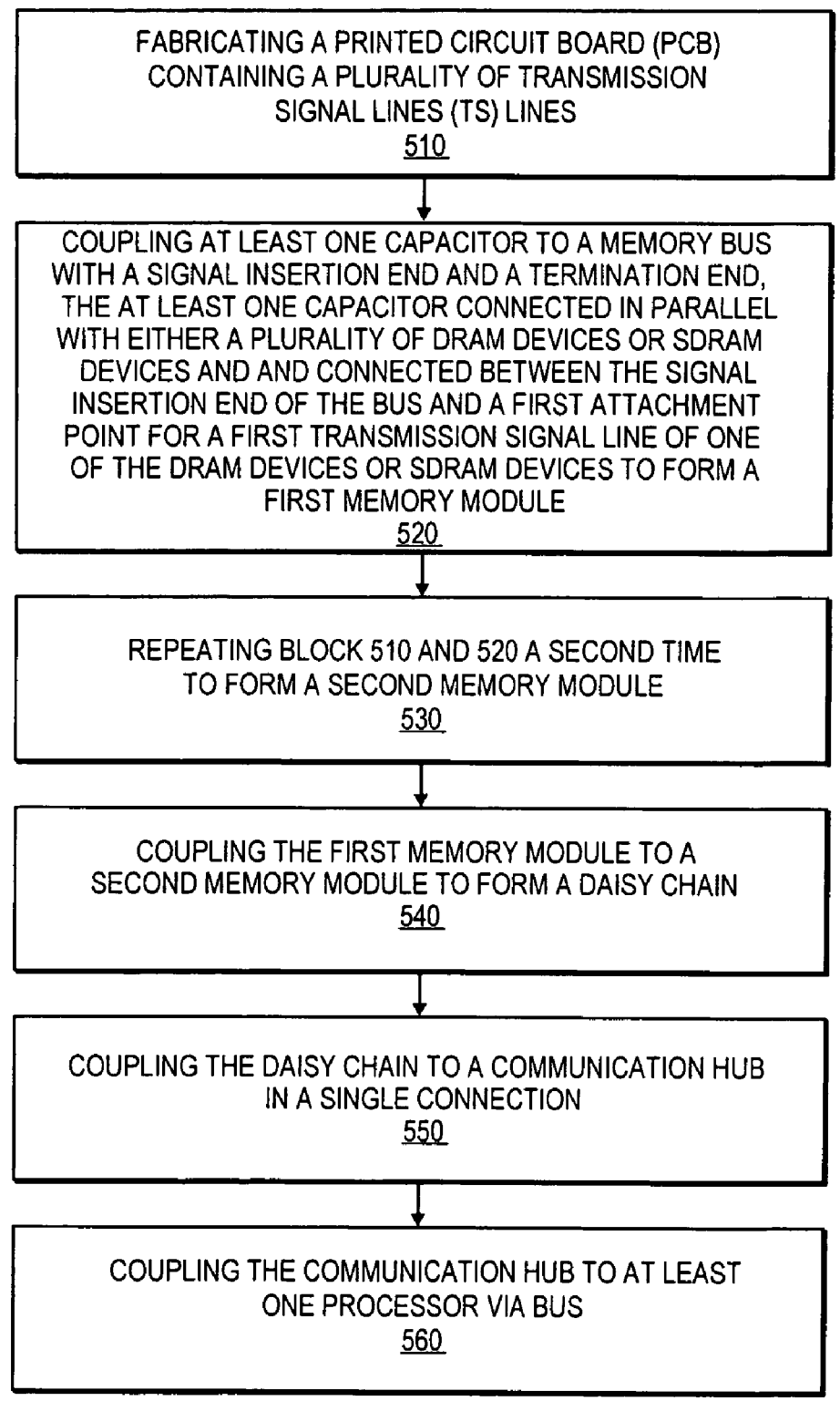
FIG. 5 is a flow diagram of one embodiment of a method to produce the computing system of FIG. 4.

FIG. 5 is a flow diagram of one embodiment of a method to produce the computing system of FIG. 4. In one embodiment, method 500 begins by fabricating a PCB containing a plurality of TS lines (block 510). The TS lines may form any pattern on the PCB and may include a memory bus.

In one embodiment, at least one capacitor is connected to a memory bus having a signal insertion end and a termination end, one capacitor connected in parallel with either a plurality of DRAM devices or SDRAM devices and connected between a signal insertion end of the memory bus and a first attachment point for a first TS line of a first DRAM device or first SDRAM device to form a first memory module (block 520). After the first memory module is formed, in one embodiment, blocks 510, 520 are repeated a subsequent time to form a second memory module (block 530).

With at least two memory modules formed, in an embodiment, the memory modules are connected to each other to form a daisy chain (block 540). In one embodiment, the daisy chain is connected to a communication hub in a single connection (block 550). The communication hub, in an embodiment, is connected to at least one processor via a bus to form a computing system (block 560).

In the preceding paragraphs, specific embodiments are described. It will, however, be evident that various modifications and changes may be made thereto without departing from the broader spirit and scope of the claims. The specification and drawings are, accordingly, to be regarded in an illustrative rather than a restrictive sense.

We claim:

1. A memory module, comprising:
a connector to connect the memory module to a system board, the connector coupled to a signal insertion end of a memory bus, wherein the signal insertion end and the memory bus are on the memory module;
a plurality of memory devices each coupled to the memory bus via one of a plurality of transmission signal lines; and
at least one capacitor coupled to the memory bus, the at least one capacitor coupled in parallel to the plurality of memory devices and coupled between the signal insertion end of the bus and a first attachment point for a first transmission signal line of the plurality of memory devices.

2. The memory module of claim 1, wherein the one of the plurality of memory devices is divided into pairs, each pair forming a branch.

3. The memory module of claim 2, wherein one capacitor is in the range of about one picofarad (pF) to about 40 pF.

4. The memory module of claim 3, wherein one capacitor is a 10 pF capacitor.

5. The memory module of claim 2, wherein the total capacitance on the bus is in the range of about one pF to about 40 pF.

6. The memory module of claim 1, wherein one capacitor is in the range of about one pF to about 40 pF.

7. The memory module of claim 6, wherein one capacitor is a 10 pF capacitor.

8. The memory module of claim 1, wherein the total capacitance on the bus is in the range of about one pF to about 40 pF.

9. The memory module of claim 1, further comprising:
a termination circuit coupled to a termination end of the memory bus, the termination end located beyond a last attachment point for a last memory device located opposite the signal insertion end of the memory bus.

10. The memory module of claim 9, wherein the termination circuit is a pull-up device.

11. A system, comprising:
a first memory module comprising:
  a connector to connect the first memory module to a system board, the connector coupled to a signal insertion end of a memory bus, wherein the signal insertion end and the memory bus are on the memory module,
  a plurality of memory devices each coupled to the memory bus via one of a plurality of transmission signal lines,
  at least one capacitor coupled to the memory bus in parallel to the plurality of memory devices between the signal insertion end of the bus and a first attachment point for a first transmission signal line of the plurality of memory devices, and
  a pull-up termination end of the memory bus disposed beyond a last attachment point for a last memory device located opposite the signal insertion end of the memory bus;
a communication hub coupled to the memory module; and
a processor coupled to the communication hub via a system bus.

12. The system of claim 11, further comprising:
a second memory module coupled to the communication hub, the second memory module including:
a second plurality of memory devices, each coupled to a second memory bus via one of a plurality of transmission signal lines,
at least one capacitor coupled to the second memory bus in parallel to the one of the second plurality of memory devices between a signal insertion end of the second memory bus and a first attachment point for a first transmission signal line of the second plurality of memory devices, and
a pull-up termination end of the second memory bus disposed beyond a last attachment point for a last memory device of the second plurality located opposite the signal insertion end of the second memory bus.

13. The system of claim 12, wherein the first memory module and the second memory module are coupled to each other to form a daisy chain.

14. The system of claim 12, wherein the first memory module, second memory and communication hub are coupled to each other in a single connection.

15. The system of claim 11, wherein the memory module comprises a dual in-line memory module (DIMM).

16. The system of claim 11, wherein the memory module comprises a single in-line memory module (SIMM).

* * * * *